(12) United States Patent
Kumar Eerpini et al.

(10) Patent No.: US 10,778,809 B2
(45) Date of Patent: Sep. 15, 2020

(54) PER-INPUT PORT, PER-CONTROL PLANE NETWORK DATA TRAFFIC CLASS CONTROL PLANE POLICING

(71) Applicant: Arista Networks, Inc., Santa Clara, CA (US)

(72) Inventors: Satish Kumar Eerpini, San Jose, CA (US); Thomas Benjamin Emmons, Sunnyvale, CA (US); Francois Labonte, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 543 days.

(21) Appl. No.: 15/253,295

(22) Filed: Aug. 31, 2016

(65) Prior Publication Data

US 2017/0251077 A1     Aug. 31, 2017

Related U.S. Application Data

(60) Provisional application No. 62/300,560, filed on Feb. 26, 2016.

(51) Int. Cl.
| | |
|---|---|
| *G06F 15/173* | (2006.01) |
| *H04L 29/08* | (2006.01) |
| *H04L 12/861* | (2013.01) |
| *H04L 12/813* | (2013.01) |
| *H04L 29/06* | (2006.01) |

(52) U.S. Cl.
CPC ........... *H04L 67/327* (2013.01); *H04L 47/20* (2013.01); *H04L 49/90* (2013.01); *H04L 29/06* (2013.01); *H04L 29/08072* (2013.01)

(58) Field of Classification Search
CPC ....... H04L 67/327; H04L 47/20; H04L 49/90; H04L 29/08072; H04L 29/06
See application file for complete search history.

(56) References Cited

U.S. PATENT DOCUMENTS

| | | | | |
|---|---|---|---|---|
| 6,078,953 | A * | 6/2000 | Vaid | H04L 12/2856 370/235 |
| 7,222,147 | B1 * | 5/2007 | Black | H04L 41/0803 709/200 |
| 7,224,668 | B1 * | 5/2007 | Smethurst | H04L 63/1458 370/229 |
| 7,263,597 | B2 * | 8/2007 | Everdell | H04L 47/10 709/201 |
| 7,315,897 | B1 * | 1/2008 | Hardee | H04L 41/00 370/231 |

(Continued)

*Primary Examiner* — Razu A Miah
(74) *Attorney, Agent, or Firm* — Haley Guiliano LLP (57) ABSTRACT

Methods and systems for per-input port, per-control plane network data traffic class control plane policing in a network element are described. In one embodiment, the method comprises receiving control plane network data at an input port of a network element, wherein the control plane network data is data that is processed by the control plane. The method may also include classifying the control plane network data based on characteristics of the control plane network data. Furthermore, the method may include storing the control plane network data in one of a plurality of output queues for the input port based on a class of the control plane network data, and forwarding control plane network data from a selected one of the plurality of output queues to a control plane of the network element.

20 Claims, 7 Drawing Sheets

NETWORK SYSTEM - 100

(56) References Cited

U.S. PATENT DOCUMENTS

| | | | | |
|---|---|---|---|---|
| 7,743,090 B1* | 6/2010 | Gibson | G06F 11/2294 | 709/202 |
| 7,768,919 B1* | 8/2010 | Conway | H04L 47/10 | 370/232 |
| 8,180,918 B2* | 5/2012 | Day | H04L 69/325 | 709/235 |
| 8,223,642 B2* | 7/2012 | Curry | H04L 47/10 | 370/235 |
| 8,448,238 B1* | 5/2013 | Gupta | H04L 67/327 | 726/15 |
| 8,797,877 B1* | 8/2014 | Perla | H04L 49/90 | 370/230 |
| 8,806,058 B1* | 8/2014 | Mackie | H04L 45/00 | 709/238 |
| 9,942,171 B2* | 4/2018 | Labonte | H04L 49/3045 | |
| 2001/0043611 A1* | 11/2001 | Kadambi | H04L 29/06 | 370/429 |
| 2002/0165961 A1* | 11/2002 | Everdell | H04L 41/22 | 709/225 |
| 2003/0088671 A1* | 5/2003 | Klinker | H04L 29/06 | 709/225 |
| 2003/0123394 A1* | 7/2003 | Neale | H04B 7/18582 | 370/235 |
| 2005/0083927 A1* | 4/2005 | Lien | H04L 45/00 | 370/389 |
| 2006/0120282 A1* | 6/2006 | Carlson | H04L 12/2801 | 370/229 |
| 2007/0165622 A1* | 7/2007 | O'Rourke | H04L 12/287 | 370/389 |
| 2007/0201357 A1* | 8/2007 | Smethurst | H04L 45/60 | 370/229 |
| 2007/0237082 A1* | 10/2007 | Han | H04L 49/9078 | 370/235 |
| 2008/0016198 A1* | 1/2008 | Johnston-Watt | H04L 67/104 | 709/223 |
| 2008/0056130 A1* | 3/2008 | Desai | H04L 12/2801 | 370/231 |
| 2008/0130601 A1* | 6/2008 | Kim | H04L 47/10 | 370/338 |
| 2008/0195750 A1* | 8/2008 | Sadovsky | G06F 21/78 | 709/234 |
| 2008/0316922 A1* | 12/2008 | Riddle | H04L 47/10 | 370/230 |
| 2009/0144442 A1* | 6/2009 | Zheng | H04L 12/2878 | 709/236 |
| 2010/0316012 A1* | 12/2010 | Stanwood | H04L 47/32 | 370/329 |
| 2011/0235509 A1* | 9/2011 | Szymanski | H04L 47/56 | 370/230 |
| 2012/0023246 A1* | 1/2012 | Castro Castro | H04W 4/08 | 709/229 |
| 2012/0124188 A1* | 5/2012 | Bahls | H04L 12/2881 | 709/223 |
| 2012/0163175 A1* | 6/2012 | Gupta | H04L 47/10 | 370/235 |
| 2013/0080619 A1* | 3/2013 | Assuncao | G06F 9/45558 | 709/224 |
| 2013/0250763 A1* | 9/2013 | Assarpour | H04L 47/12 | 370/235 |
| 2014/0052838 A1* | 2/2014 | Giacomoni | H04L 41/0893 | 709/223 |
| 2014/0119193 A1* | 5/2014 | Anand | H04L 45/28 | 370/237 |
| 2015/0067135 A1* | 3/2015 | Wang | G06Q 10/06 | 709/223 |
| 2015/0156122 A1* | 6/2015 | Singh | H04L 47/193 | 370/235 |
| 2016/0099857 A1* | 4/2016 | Begwani | H04L 43/08 | 370/252 |
| 2018/0198736 A1 | 7/2018 | Labonte et al. | | |

* cited by examiner

FIG. 7

PER-INPUT PORT, PER-CONTROL PLANE NETWORK DATA TRAFFIC CLASS CONTROL PLANE POLICING

RELATED APPLICATION

This application claims the benefit under 35 U.S.C. § 119(e) of U.S. Provisional Patent Application No. 62/300,560, filed Feb. 26, 2016, the contents of which are incorporated by reference herein.

FIELD OF INVENTION

This invention relates generally to data networking and more particularly to per-input port, per-control plane network data traffic class control plane policing by a network element.

BACKGROUND OF THE INVENTION

A network element (such as a router or switch) transmits and receives network data using one or more ports of that network element. Each port on the network element has a physical link speed that limits the rate at which network data can be transmitted from that port. The network element uses one or more queues to store the network data that is to be transmitted from one of the ports of the network element.

One type of network data that is transmitted from the one or more ports is control plane network data. This is network data that is to be transmitted to a control plane of the network element, and processed by a control plane processor. The control plane processor is responsible for configuring the network element, maintaining forwarding routes for the network element, and for performing other network element functions. Thus, proper and expedient processing of control plane network data is essential to the healthy functioning of a network element, as well as to the network to which the network element belongs.

Denial of service attacks are a threat to network elements. These types of attacks may involve otherwise innocuous network traffic, but result in a control plane processor of a network element being made unavailable for the normal processing of control plane functions. This is generally achieved purposefully by an attacker, or unknowingly by a benign source, by flooding the control plane processor with control plane network data messages. The control plane network data may be innocuous, and are only sent to the control plane for the purpose of consuming processing resources. The volume of innocuous control plane network data in a denial of service attack, which is queued and forwarded to the control plane processor, can cause the control plane processor to expend resources to process the flood of attack traffic, thereby denying or severely limiting services to legitimate control plane network data (e.g., protocol network data, routing network data, etc.).

SUMMARY OF THE DESCRIPTION

A method and a device for per-input port, per-control plane network data traffic class control plane policing in a network element is described. In an exemplary embodiment, a network element receives control plane network data at an input port of the network element, where the control plane network data is data that is processed by the control plane. The network element further classifies the control plane network data based on characteristics of the control plane network data, and stores the control plane network data in one of a plurality of output queues for the input port based on a class of the control plane network data. The network element forwards control plane network data from a selected one of the plurality of output queues to a control plane of the network element. Additionally, in one embodiment, each output queue of the input port is associated with a single class of control plane network data. Furthermore, in one embodiment, each output queue of the input port of the network element is associated with a single class of control plane network data.

In another embodiment, the network element determines whether the control plane network data can be enqueued on an output queue specific to the input port for the control plane network data. When the control plane network data cannot be enqueued on an output queue specific to the input port, a policer test is applied to the control plane network data based on a combination of the input port and the class of the control plane network data. Furthermore, the control plane network data is stored in a common queue for the class of control plane network data when a bandwidth requirement associated with a policer applying the policer test is satisfied.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Methods and systems for per-input port, per-control plane network data traffic class control plane policing in a network element are described. Network elements, such as switches, routers, hubs, bridges, gateways, a chip/forwarding engine, etc. are susceptible to several types of attacks. One type of attack is a denial of service attack perpetrated by flooding a control plane of the network element with otherwise innocuous control plane network data messages. Similarly, a bug or misconfiguration of a network element could also result in a flood of control plane network data messages. The flood of control plane network data messages are forwarded to a control plane processor of the network element, thereby consuming all or virtually all of the control plane processors resources. That is, since the rate of front panel ports is orders of magnitude higher than the rate of the control plane, control plane packets can get dropped causing disruptions both for different classes of control plane traffic and from non-offending peers. Thus, legitimate control plane network data messages, such as protocol updates, routing decisions, route updates, etc. are delayed or prevented from reaching the control plane processor, resulting in a denial of service to the legitimate control plane network data messages, and the devices/users originating those legitimate messages.

In one embodiment, control plane network data messages are policed for each input port of a network element, and further for each control plane network data traffic class. In one embodiment, for control plane network data messages received at an input port of a network element, the messages are sorted into a plurality of different a virtual output queues (VOQs) associated with that input port. In embodiments, the incoming control plane network data messages are sorted and stored in different VOQs based on which port received a control plane network data message, and further based on the class of control plane network data message. Each of these VOQs may be shaped to determine if network policies are being violated, to locate patterns associated with network attacks (e.g., denial of service attacks), etc. Thus, specific ports can be identified as potentially being under attack and/or specific message classes can be identified as being part of an attack. The shape rate and/or tail drop threshold for each queue will eventually cause a queue under attack to drop packets, thereby automatically isolating the disruption to a specific port and traffic class. Furthermore, by shaping specific ports and/or control plane network data message traffic classes, a network element may continue to serve devices/users connected to non-affected ports.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network System and Network Elements

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

Figure 1:
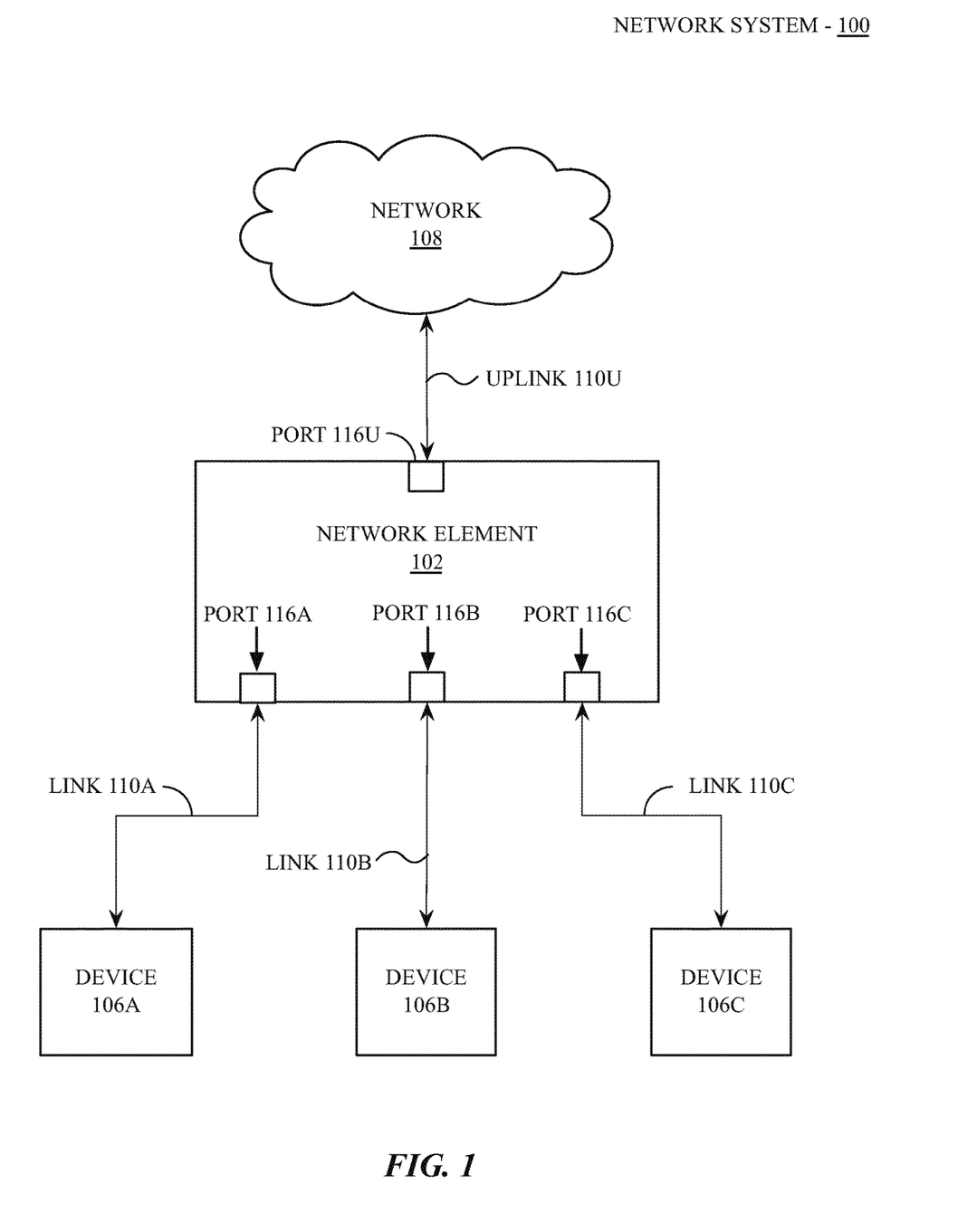
FIG. 1 is a block diagram of one embodiment of a system that includes a network element communicating network data between a network and a number of devices.

FIG. 1 is a block diagram of one embodiment of a network system 100 that includes a network element 102 communicating network data between a network 108 and a number of devices 106A-C. In various embodiments, the network element 102 is one or more of a switch, router, hub, bridge, gateway, etc., or any type of device that can provide access to a network 108 (e.g., physical network, virtualized network, etc.). In one embodiment, the network element 102 can be a virtual or a physical network element. In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U can be configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments, links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network element due to the processing time involved in buffering, queuing, processing and forwarding network data from a source port to a destination port in that network element.

In one embodiment, network element 102 may be attacked by any of device 106A-C, as well as other devices (not shown). The attack may be a purposeful/adversarial attack, as well as an attack that results due to a bug or misconfiguration. For example, a device 106B may flood port 116B with illegitimate control plane network data messages, which as discussed in greater detail below, are messages transmitted to and processed by a control plane processor of network element 102. It should be noted that while the control plane network data messages are referred to as illegitimate (e.g., are not for the specific purpose of furthering the processing and transmission of network messages), the control plane network data messages are not necessarily intrinsically harmful (e.g., are not intended to inflict harm on the network element 102 from the message itself). Rather, the flood of control plane network data messages consume all, or a severely disproportionate, amount of the control plane processor's resources. As a result, services provided by network element 102 to other devices (e.g., device 106A and 106C) can be unacceptably slowed or shut down.

To combat such attacks, in one embodiment and as discussed in greater detail below, each of ports 116A-C is associated with a plurality of virtual output queues that store control plane messages in queues corresponding to a class of the message (e.g., classes associated with specific message types/purposes). Furthermore, each port has its own plurality of virtual output queues. Messages from the plurality of queues for each port are then selected and forwarded, such as by a round robin, token-based, weighted round robin, etc. selection process, to the control plane processor up to a certain maximum shape rate. Thus, no one type of message can be used for a denial of service attack, since the messages of different classes are distributed into different virtual output queues (e.g., a single virtual output queue linked to an attack are limited by the shape rate and can be shut down, and messages from other virtual output queues may continue). Furthermore, if a denial of service attack does originate from a specific port (e.g., port 116B), that port can be turned off without impacting the messaging between ports 116A and 116C and/or devices 106A and 106C.

Figure 2:
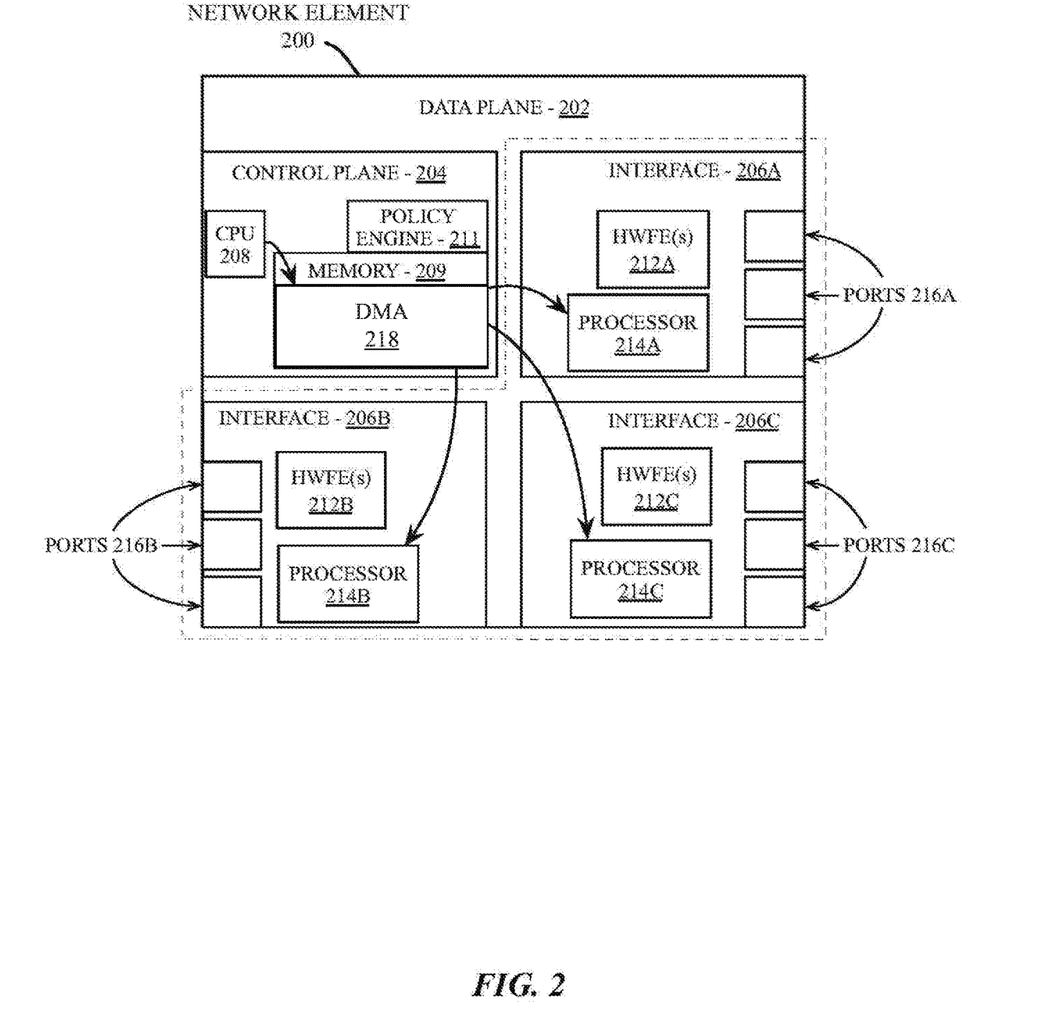
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. As discussed herein, CPU 208 is interchangeably referred to as a control plane processor of network element 200. The CPU 208 is used to process information for the control plane 204 and writes configuration data for hardware forwarding engines 212A-C in the network interface devices 206A-C. The information processed by CPU 208 includes, for example, control plane network data corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network element), messages for routing table misses, time control messages (e.g., precision time protocol messages), messages for packets marked as being of interest for snooping (e.g., access control list logging and port mirroring messages), messages used to collect traffic diagnostics, address resolution messages (ARP) requests and replies, neighbor solicitation requests and replies, general communication to the control plane of the networking device, etc. CPU 208 processes the control plane network data to perform control management updates and/or respond with control message responses (e.g., routing decisions, protocol updates, traffic resolutions, etc.).

In one embodiment, the data plane 202 receives, processes, and forwards network data, including control plane network data, using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C includes multiple ports 216A-C that are used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processor 214A-C, and ports 216A-C, respectively. Each hardware forwarding engine 212A-C forwards data for the network element 200, such as performing routing, switching, or other types of network forwarding. Each processor 214A-C can be used to accelerate various functions of the interface devices 206A-C. For example and in one embodiment, the processors 214A-C can push data from the hardware forwarding engines 212A-C to a CPU 208 in the control plane 204.

In one embodiment, for each received unit of control plane network data, the data plane 202 forwards the control plane network data to the CPU 208 (e.g., the control plane processor). In one embodiment, the control plane 204 gathers configuration data for the hardware forwarding engines 212A-C in control plane network data messages from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C. In one embodiment, to protect the efficient and healthy functioning of CPU 208, for each port of each interface, two or more virtual output queues for control plane network data are maintained in a memory, such as buffers of interfaces 206A-C. The two or more output queues group control plane network data based on traffic type, such as class of control plane network data message, for selection and forwarding to CPU 208. In one embodiment, for each port of each interface, one virtual output queue is maintained for each message class. Thus, in one embodiment, the total number of control plane virtual output queues for a network element can be the number of ports per interface, times the number of interfaces, times the number of message classes.

In one embodiment, the memory 209 that is used to store data for the control plane 204 is shared with the data plane 202. In such embodiment, a direct memory access (DMA) controller 218 is coupled to the memory 209 to allow processors 214A-C direct access to the memory 209.

In one embodiment, the control plane 204 includes a policy engine 211 to apply a QoS policy to network traffic flowing through the network element 200. The policy engine 211 can be configured to minimize the latency of some type of network traffic, to apply traffic shaping policies on the overall flow of traffic through the network element or within a larger network topology, or to apply shaping and bandwidth policies to control plane network data to be forwarded to CPU 208. Proper determination of real-time latency data within the network can be key to the implementation of effective QoS policy. In one embodiment, policy engine 211 applies shaping (e.g., a maximum allowable rate) and bandwidth (e.g., a minimum throughput rate for a message queue) policies to each virtual output queue. Furthermore, policy engine 211 can monitor for evidence of an ongoing attack, such as a denial of service attack, at a port based on message class. Thus, each message class can have its own control plane forwarding policy (e.g., having its own bandwidth and shape), and policies enforced based on message class. Thus, even when a single message class from a single port is misbehaving (e.g., exhibits behavior indicative of a denial of service attack, exceeds the limits of a defined shape and/or bandwidth), the policy engine 211 can shut off the misbehaving port. However, the other ports of the interface, as well as the network element 200, remain unaffected.

Forwarding Engine Pipeline

Figure 3:
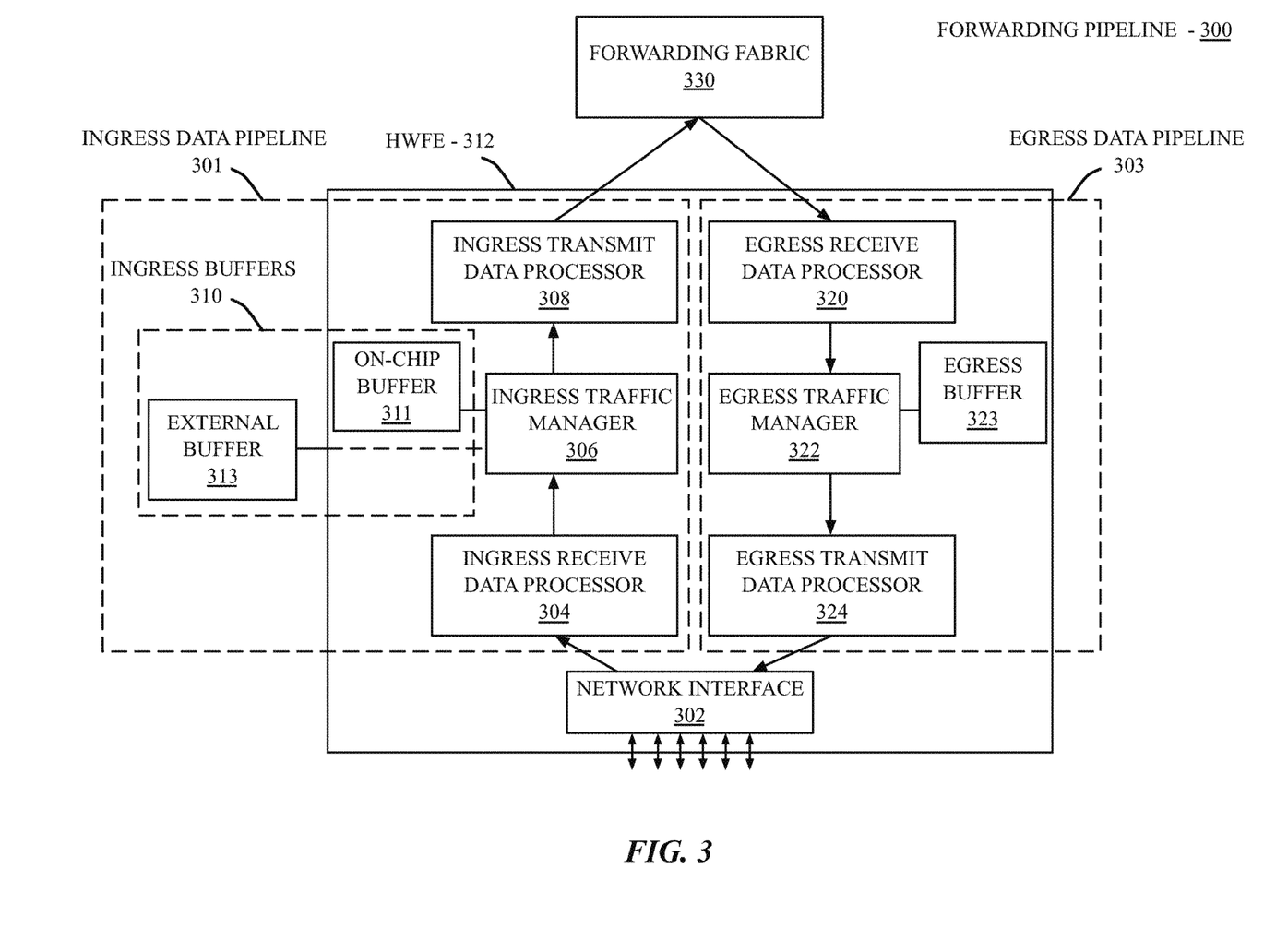
FIG. 3 is a block diagram of one embodiment of a forwarding pipeline within one embodiment of a network element.

FIG. 3 is a block diagram of one embodiment of a forwarding pipeline 300 within one embodiment of a network element. In one embodiment, the forwarding pipeline 300 resides in a hardware forwarding engine (e.g., HWFE 312), which includes logic from one or more of the HWFE(s) 212 within each interface 206 shown in FIG. 2. In one embodiment, within the HWFE 312 resides an ingress data pipeline 301 including a network interface 302, an ingress receive data processor 304, an ingress traffic manager 306, and/or an ingress transmit data processor 308. The ingress data pipeline 301 can include ingress buffers 310, which in one embodiment include an on-chip buffer 311 that resides in on-chip memory of the HWFE 312. Additionally, an external buffer 313 may also be included. The external buffer 313 can reside in an array of high speed, low latency random access memory (RAM) coupled to the HWFE 312 via a memory bus, which in one embodiment is a multi-channel memory bus.

In one embodiment, the ingress data pipeline 301 of the HWFE 312 works in concert with an egress data pipeline 303 residing within the HWFE 312. The egress data pipeline 303 can include an egress receive data processor 320, an egress traffic manager 322, on chip memory storing an egress buffer 323, and and/or an egress transmit data processor 324, which couples to the network interface. In one embodiment, the ingress data pipeline 301 and the egress data pipeline 303 each couple with a forwarding fabric 330, which can include one or more crossbar switches that interconnect multiple interfaces (e.g., interface 206A-C as in FIG. 2).

In one embodiment, the network interface 302 includes a physical layer (e.g., layer 1) interface including one or more ports (e.g., ports 216 as in FIG. 2). The physical layer is responsible for transmission and reception of bit streams across physical connections including encoding, multiplexing, synchronization, clock recovery and serialization of the data on the wire for whatever speed or type of interface is configured. In one embodiment, the network interface 302 supports combinations of 100 gigabits per second, 50 gigabits per second, 40 gigabits per second, 25 gigabits per second, 10 gigabits per second, and/or 1 gigabits per second ports, and ports may be combined into link aggregation groups using, for example, static link aggregation or link aggregation control protocol (LACP). In one embodiment, optical (e.g., fiber optic) and electrical (e.g., copper) connections are supported.

In one embodiment, the network interface 302 additionally includes data-link layer (e.g., layer 2) logic including media access control (MAC) and/or logical link control (LLC) logic. When a valid data stream is received at the physical layer, the data can be passed on to the MAC portion of the data link layer. In one embodiment, the physical and data-link layer logic is in compliance with the IEEE 802.3 Ethernet standard, although other technologies may be supported. In embodiments supporting the Ethernet standard, the MAC portion may divide the incoming data stream into Ethernet frames, although the techniques described herein may apply to equivalent network data units of other protocols and standards.

While the forwarding pipeline 300 is illustrating with specific individual logic elements within the ingress data pipeline 301 and egress data pipeline 303 of the HWFE 312, one having ordinary skill in the art will recognize that equivalent functionality may generally be performed by other logic elements within the forwarding pipeline 300 for network data within a hardware forwarding engine of a network element.

The network interface 302 can couple with the ingress receive data processor 304, which includes forwarding logic for incoming control plane and network data. In one embodiment, the ingress receive data processor 304 logic is flexible and can be configured to support new protocols and forwarding methods as they become available. The ingress receive data processor 304, in one embodiment, can parse the headers of incoming control plane and network data units and extract fields used to make forwarding decisions, such as data-link layer source and destination addresses (e.g., MAC addresses), virtual local area network (VLAN) headers, or network layer (e.g., layer 3) source and destination addresses and/or port numbers, local port identifiers (e.g., which port 216 of an interface 206 a unit of network or control plane data was addressed to), interface identifiers (e.g., which interface 206 a unit of network or control plane data was received on), etc. In one embodiment, the ingress receive data processor 304 can perform forwarding at the data-link layer or network layer based on address information in the network data unit headers.

In one embodiment, the ingress data pipeline 301 includes logic for an ingress traffic manager 306 that is responsible for packet queuing and scheduling after data-link layer or network layer forwarding decisions have been made. The ingress traffic manager 306 can queue incoming units of control plane and network data within virtual output queues (VOQs) stored in ingress buffers 310. In one embodiment, the ingress buffers include an on chip buffer 311 stored in on-die or on-package memory of the HWFE, as well as at least one external buffer 313 stored in external (e.g., chipset) memory that is coupled to the HWFE 312.

In one embodiment, each HWFE 312 includes a plurality of per-input port VOQs, where each VOQ for each input port is associated with a different class of control plane network data message. In one embodiment, the VOQs may be split between the on-chip buffer 311 and the external buffer 313. However, embodiments are not limited to this configuration, as VOQs may be stored entirely in the on-chip buffer 311 or entirely in the external buffer 313 depending on system configuration. In one embodiment, traffic manager 306 queues control plane network data messages into corresponding queues based on the interface (e.g., using a global identifier that identifies the interface), which port the control plane network data (e.g., a local/port identifier) was received, and a class of control plane network data message. The per-input port, per-class of control plane message VOQs provide increased scheduling granularity and policy control over control plane network data destined for a control plane processor (e.g., CPU 208).

In some embodiments the HWFE 312 supports multiple control plane network data traffic classes for use in implementing Quality of Service (QoS) policies, or other policy based forwarding techniques. In one embodiment, up to 25 (or more) distinct control plane traffic classes may be configured and separate VOQs are provided for each class of control plane traffic and for each port. Furthermore, in embodiments, a user may create a number of new classes of traffic, such as for example a class of traffic corresponding to boarder gateway protocol (BGP) traffic from known peers, which can be mapped to its own VOQ based on one or more data fields within a packet header of the user created class of traffic. Per-port and class of traffic VOQs may be provided both per-input port as well as per forwarding engine.

In one embodiment, once a unit of control plane network data is buffered in a per-input port and per-control plane class of traffic VOQ, the ingress data pipeline 301, for example, via the ingress traffic manager 306, selects and forwards units of control plane network data (e.g., control plane messages) to their destination (e.g., a control plane processor) using the ingress transmit processor 308. Ingress traffic manager 306, for example, can select which per-input port and per-control plane class of traffic VOQ to forward a unit of control plane network data from based on various techniques, such as a round robin based selection, weighted round robin, weighted fair queueing, a token based system, etc. The control plane transmit processor 308 forwards the selected unit of control plane network data across the forwarding fabric 330 to the control plane processor (not shown), to enable the control plane processor to process the control plane network data to update routes, update protocols, make routing decisions, etc. In one embodiment, the control plane processor may respond to the control plane network data with a message via the egress data pipeline 303.

Figure 4:
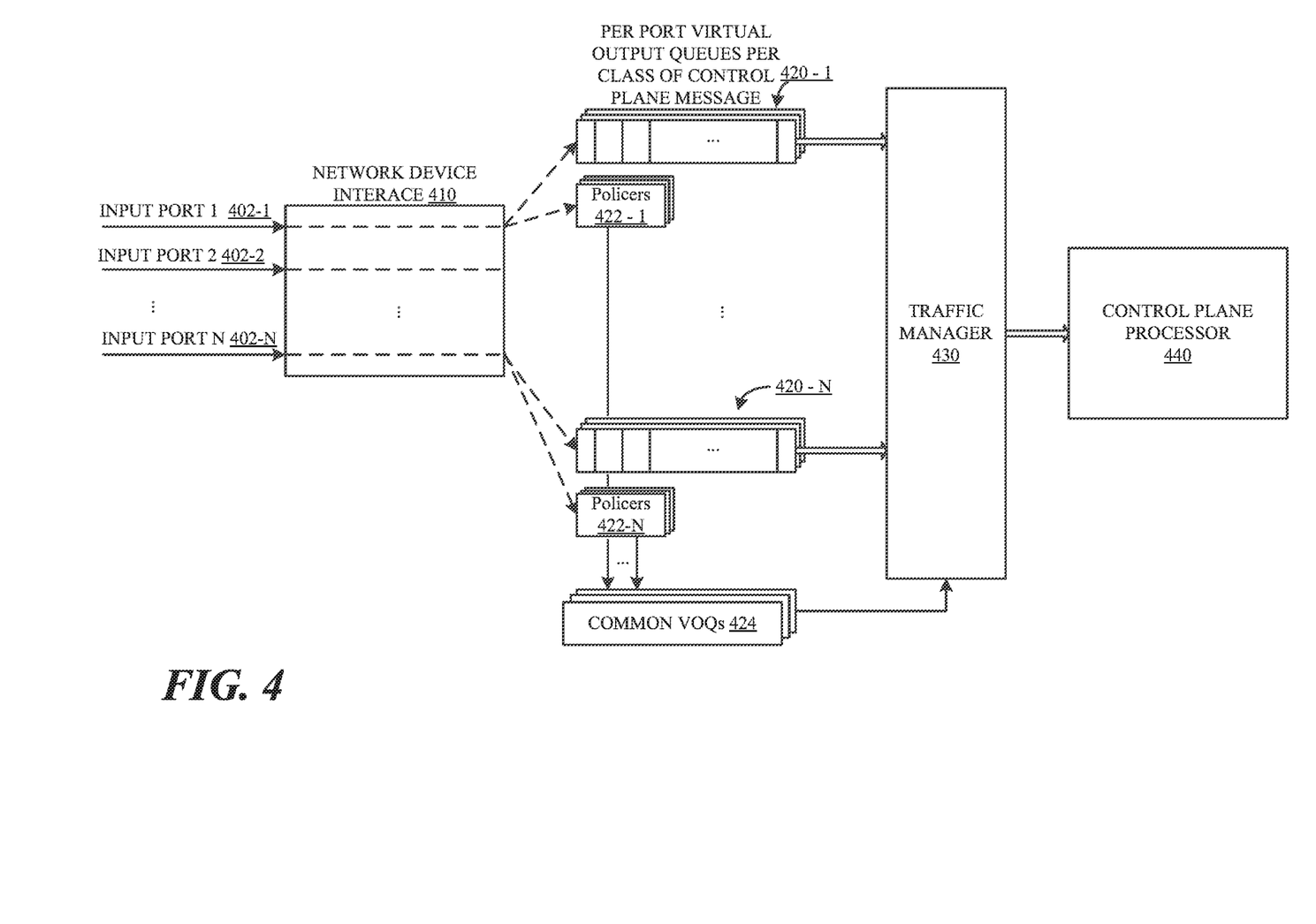
FIG. 4 is a block diagram of one embodiment of performing control plane policing using per-input port virtual output queues (VOQs) per class of control plane network data traffic.

FIG. 4 is a block diagram of one embodiment of performing control plane policing using per-input port VOQs per class of control plane network data traffic. In one embodiment, a network element includes a network element interface 410 with a plurality of input ports 402-1 through 402-N. In embodiments, the network element interface 410 may have up to 72 ports per network element, although the number of input ports need not be limited to 72. As discussed herein, the input ports receive units of control plane and network data.

Units of received control plane network data may then be stored in a per-port, per-class of traffic VOQs. In one embodiment, virtual output queues (VOQs) 420-1 through 420-N reside within an ingress data pipeline of a HWFE (e.g., HWFE(s) 212A-C). Furthermore, as discussed herein, there are a set of VOQs 420 per input port 402, and the set includes a different VOQ for each class of control plane network data. Thus, once control plane network data is received at an input port (e.g., 402-1), the control plane network data is stored in a VOQ specific for the class of control plane traffic and for the input port and interface at which the control plane network data was received. Thus, a classification on the class of control plane traffic, and a local identifier indicative of which port control plane network data was addressed to, are used to sort the received data into the appropriate VOQ 420.

Traffic manager 430 is responsible for selecting control plane network data messages from the various VOQs 420 for forwarding to the control plane processor 440. As discussed above, the traffic manager 430 may be part of an ingress data pipeline of a HWFE, and selects control plane network data messages based on a round robin, token-based, weighted round robin, weighted fair queueing, etc. selection method. Although not shown, a policy engine (e.g., policy engine 211) may monitor the routing of control plane network data messages to control plane processor 440 to ensure that certain QOS is satisfied. Furthermore, the QOS may be satisfied by assigning each VOQ 420 its own shape and bandwidth, as discussed above. The shape and bandwidth may be managed by traffic manager 430 when selecting control plane network data messages from the VOQs 420 for forwarding to the control plane processor.

For certain types of control plane network data messages, such as multicast messages (e.g., a one-to-many message), snooping/mirroring messages (e.g., copies of packets that are sent by a network device for monitoring purposes), as well as other types of control plane data messages, it might not be possible to enqueue the traffic into VOQs based on the input port (e.g., because a VOQ is not established for the class of traffic for the input port). In one embodiment, such messages, which do not have a per input port per class of traffic VOQ, instead have a policer specific to the input port and the class of traffic applied. In one embodiment, one of policers 422-1 through policers 422-N is applied to a control plane network data message that does not get forwarded to a input port VOQ, and the specific policer that receives the control plane network data message is based on the class of traffic. Each policer is associated with a bandwidth, so that when a policer receives packets at a rate below the policer rate, those packets can get enqueued in one of the common VOQs 424 for the class of traffic shared by the different port policers for corresponding classes of messages. In one embodiment, the policers 422-1 through 422-N have a burst and maximum rate above which they drop packets on the common VOQs 424, where packets are scheduled and forwarded from the common VOQs 424 to the control plane processor 440 by the traffic manager 430

In one embodiment, the decision to send packets of network data to the control plane processor 440 might be taken on the egress of network device interface 410 by a processor. In this embodiment, on egress from network device 410, a packet may need to be forwarded to control plane processor 440. Such forwarding can be determined due to maximum transmission size enforcement, egress transaction mirroring, etc. When network data is determined to be forwarded to the control plane processor 440, the network data is first recycled back to the ingress processor and then enqueued to one of the VOQs 420-1 through 420-N based on the port where that packet was destined and the class of traffic of the network data, as discussed herein. In one embodiment, additional VOQs may be maintained for each egress port and each message class that may be susceptible to forwarding to control plane processor 440 on egress.

In the embodiments discussed above, when an input port (e.g., input port 402-1) is being flooded with control plane network data messages, the VOQs ensure that a denial of service is avoided. That is, for example, the control plane network data messages flooding input port 402-1 may be of a single type of message class, which is queued in one of VOQs 420-1. Thus, the remaining VOQs of 420-1 corresponding to different classes of control plane network data messages remain unaffected by the flood, thus ensuring that port 402-1 may remain functional for other classes of control plane messages. Thus, in this example, the flood of control plane network data messages would not affect the remaining ports (e.g., ports 402-2 through 402-N). Furthermore, a policy monitor (e.g., policy engine 211) could further monitor the VOQs to detect misbehaving (e.g., potential flood situations) ports and/or specific control plane network data message classes.

Figure 5:
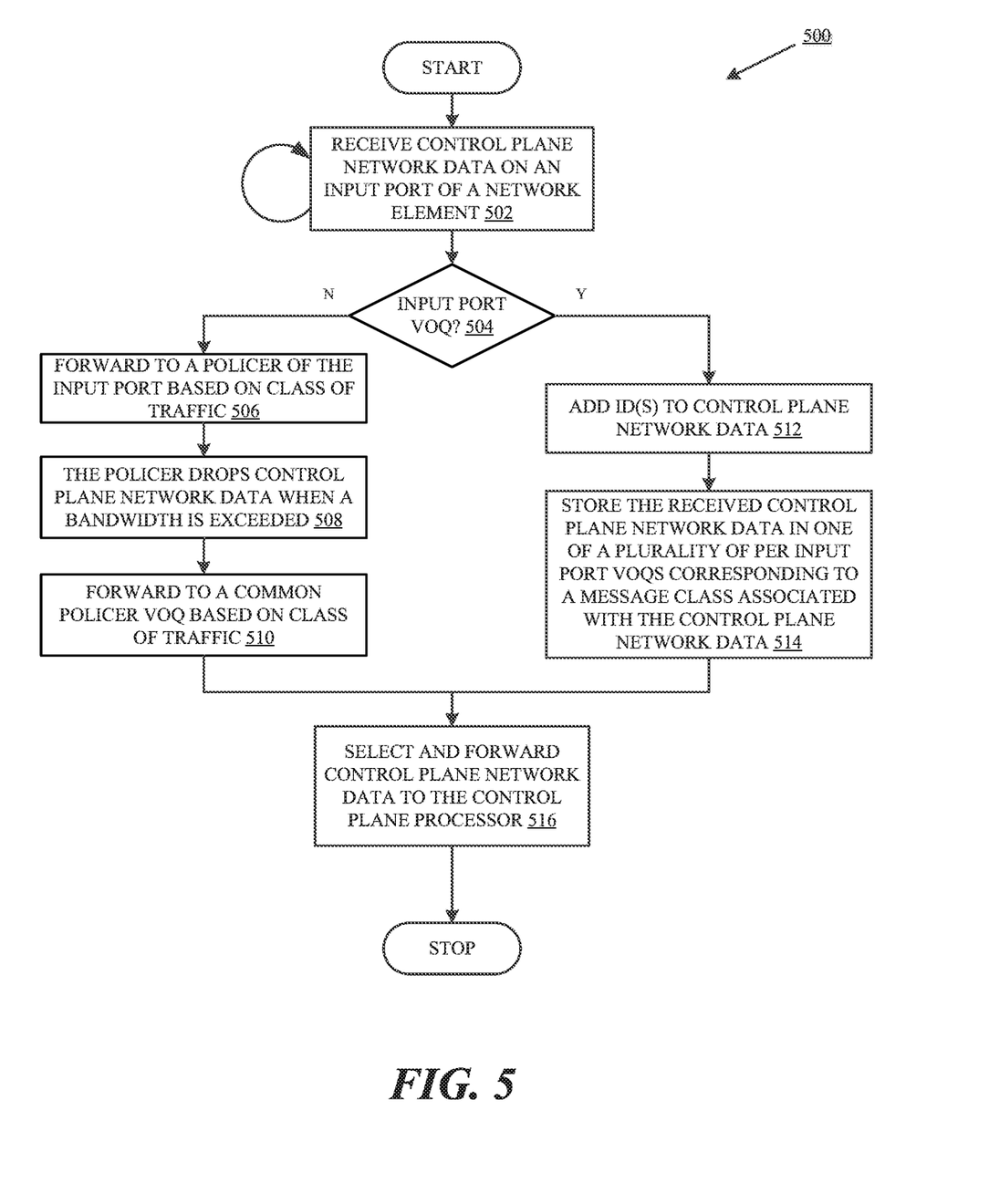
FIG. 5 is a flow diagram of one embodiment of forwarding logic utilizing per-input port virtual output queues (VOQs) for performing control plane policing.

FIG. 5 is a flow diagram of one embodiment of a forwarding logic utilizing per-input port virtual output queues (VOQs) for performing control plane policing. The process may be performed by processing logic that comprises hardware (e.g., circuitry, dedicated logic, etc.), software (such as is run on a general-purpose computer system or a dedicated or specialized machine), firmware, or a combination. In one embodiment, the process is performed by a network element (e.g., network element 102, network element 202, or a network element with forwarding pipeline 300).

The process begins by receiving control plane network data on an input port of a network element (processing logic 502). The control plane network data may comprise units of control plane network data that serve as messages to a control plane processor. For example, the control plane network data may include routing protocol updates, requests for routing decisions, routing table updates, as well as other messages. Furthermore, the control plane network data may take the form of one of a plurality of different classes of control plane network data.

Processing logic determines whether a control plane destined network data (e.g., a data packet) can be enqueued in a VOQ based on the input port (processing block 504). Some messages, such as multicast control plane network data, may not be enqueued to the control plane on a VOQ specific to the input port, such as when a per input port VOQ does not exist for the class of control plane network data or when a class of traffic does not have a separate per input port VOQ. In this case, processing logic applies a per-input port and per class of traffic policer to the control plane network data (processing block 506). In one embodiment, the policer is associated with a bandwidth (e.g., a rate) above which the packets are dropped, and processing logic drops control plane network data when the bandwidth is exceeded (processing block 508). Processing logic then enqueues the control plane network data to a VOQ common to packets of that class of control plane traffic by forwarding the control plane network data to a common policer VOQ based on its class of traffic (processing block 510). In one embodiment, the common VOQs 424 are a set of per class VOQs that are shared by different port policers for corresponding classes of message.

However, when processing logic determines that this control plane network data can be enqueued onto a VOQ per input port (processing block 504), processing logic adds a local ID to a base VOQ ID for class of traffic of the control plane network data (processing block 512). Thus, the control plane network data, with the ID(s) can be identified and, as discussed herein, stored in the appropriate VOQ.

Processing logic stores the received control plane network data in one of a plurality of per input port VOQs based on a class of the control plane network data (processing block 514). In one embodiment, a VOQ for each message class is provided for each port. Thus, the message class is the final piece of information that processing logic utilizes to store the control plane network data in the appropriate VOQ (e.g., based on the message class and port).

Processing logic selects and forwards the control plane network data to a control plane processor (processing block 516). The control plane processor, as discussed herein, may then ingest the message and take an appropriate action (e.g., perform a protocol update, make a routing table update, make a decision on data forwarding, etc.). Furthermore, in the embodiments discussed above, the resources of the control plane processor are protected from denial of service attacks by isolating control plane network data based on port and class of message using the per-input port per-control plane network data message class VOQs as well as the policers. If any of these are misbehaving in a way that would signal a denial of service attack, the appropriate port or control plane network data message class will be shaped to it's maximum rate.

Figure 6:
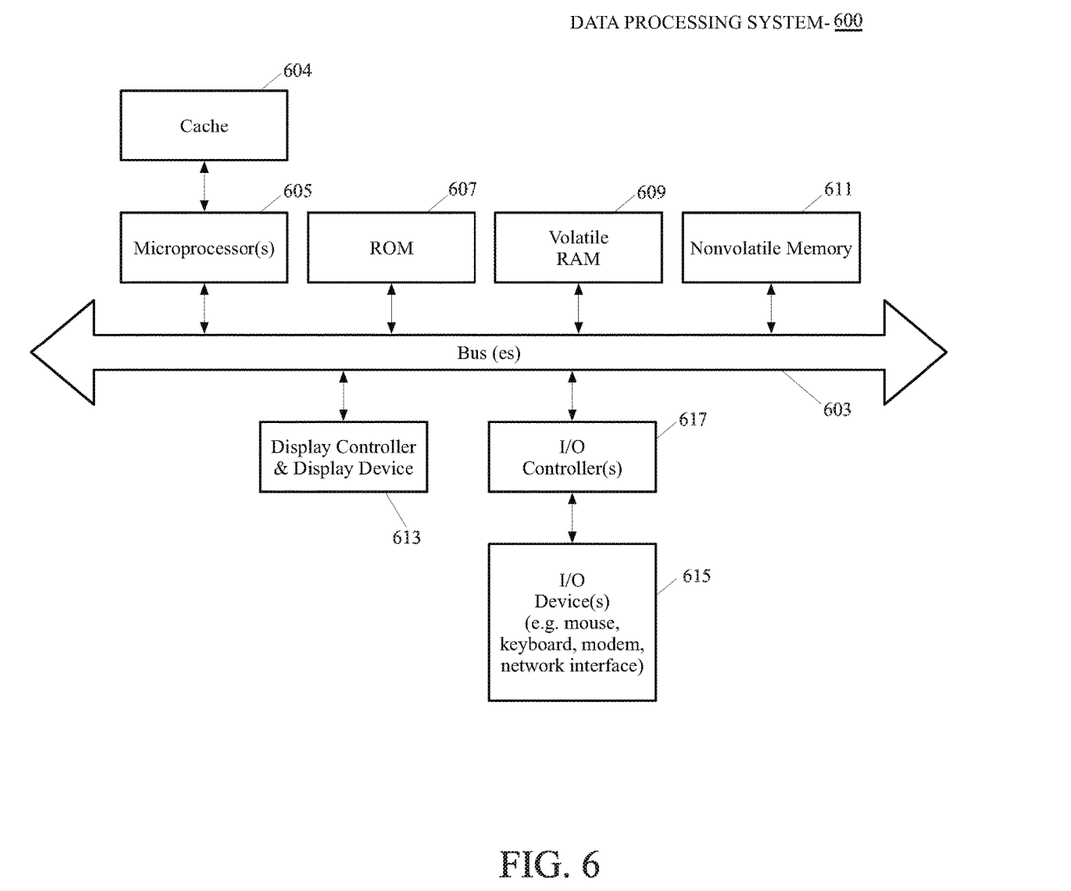
FIG. 6 shows one example of a data processing system, which may be used with one embodiment of the present invention.

FIG. 6 shows one example of a data processing system 600, which may be used with one embodiment of the present invention. For example, the data processing system 600 may be implemented including one or more of network element 102 as in FIG. 1 or network element 200 as in FIG. 2. Note that while FIG. 6 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 600 includes one or more bus(es) 603 which couple to one or more microprocessor(s) 605, ROM (Read Only Memory) 607, volatile RAM 609 and a non-volatile memory 611. In one embodiment, the one or more microprocessor(s) 605 couple to a cache 604, which can include one or more sets of instruction and/or data caches. The bus(es) 603 may include one or more buses connected to each other through various bridges, controllers and/or adapters as is well known in the art.

The microprocessor(s) 605 may retrieve the instructions from the memories 607, 609, 611 and execute the instructions to perform operations described above. During execution, instructions and/or associated data retrieved from the memories 607, 609, 611 may be stored in the cache 604. The bus(es) 603 interconnect system components with each other, and to a display controller and display device 613, and to peripheral devices such as input/output (I/O) devices, which may be mice, keyboards, modems, network interfaces, printers and other devices well known in the art. Typically, the input/output devices 615 are coupled to the system via input/output controller(s) 617. The volatile RAM (Random Access Memory) 609 is typically implemented as dynamic RAM (DRAM), which requires power continually in order to refresh or maintain the data in the memory, but may also include static ram (SRAM), which does not require a periodic refresh.

In one embodiment, the non-volatile memory 611 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 611 will also be a random access memory although this is not required. While FIG. 6 shows that the non-volatile memory 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
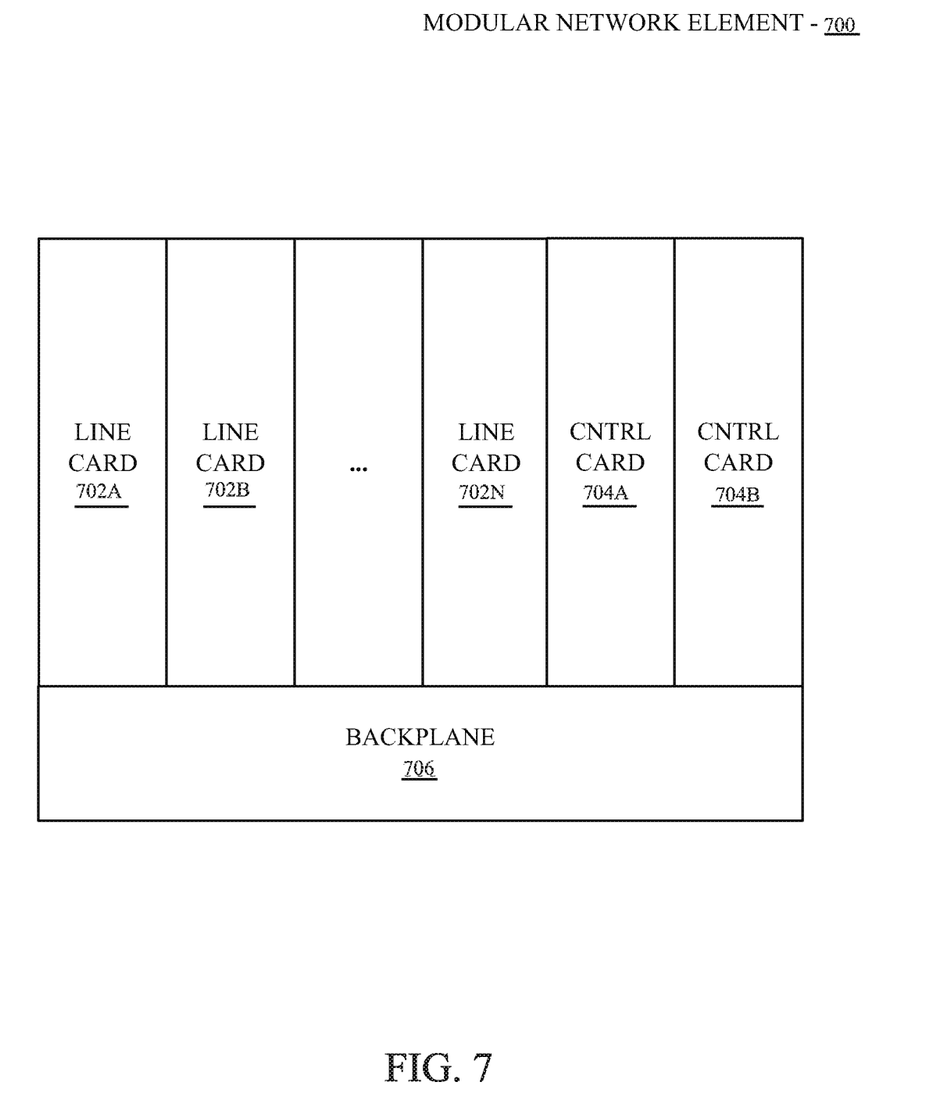
FIG. 7 is a block diagram of an additional embodiment of an exemplary network element as described herein.

FIG. 7 is a block diagram of an additional embodiment of an exemplary modular network element 700 as described herein. In one embodiment, the network element has a modular and expandable configuration that allows the addition or removal of resources configured as line cards 702A-N, or controller cards 704A-B coupled to a backplane 706. In one embodiment, the controller cards 704A-B control the processing of the traffic by the line cards 702A-N, which can each include one or more network data forwarding devices such as interfaces 206A-C as in FIG. 2, although the precise nature of the forwarding devices is not limited as such. In addition, the controller card 704A-B can performing control plane policing using VOQs for control plane network data message classes, as discussed above. It should be understood that the architecture of the network element 700 illustrated in FIG. 7 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "receiving," "determining," "transmitting," "sending," "forwarding," "detecting," "gathering," "dropping," "communicating," "applying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A non-transitory machine-readable medium storing instructions which, when executed by one or more processing units of a network element, cause the processing units to perform operations comprising:
   receiving control plane network data at an input port of the network element, the network element comprising a plurality of input ports, each of the input ports being associated with a different plurality of output queues, wherein the control plane network data is data that is processed by the control plane;
   classifying the control plane network data based on characteristics of the control plane network data;
storing the control plane network data in one of a plurality of output queues specific to the input port based on a class of the control plane network data; and
   forwarding control plane network data from a selected one of the plurality of output queues specific to the input port to a control plane of the network element, wherein:
   each output queue is associated with a bandwidth, a shape, or a combination thereof; and
   control plane network data is dropped before placement in one of a plurality of output queues when a bandwidth requirement associated with the one of the plurality of output queues is exceeded and the one of the plurality of output queues is bigger than an associated tail drop threshold.

2. The non-transitory machine-readable medium of claim 1, wherein each output queue of the input port is associated with a set of classes of control plane network data.

3. The non-transitory machine-readable medium of claim 1, wherein each output queue of the input port is associated with a single class of control plane network data.

4. The non-transitory machine-readable medium of claim 1, wherein the control plane network data comprises a system message for delivery to the control plane processor.

5. The non-transitory machine-readable medium of claim 1, wherein the control plane network data comprises a routing protocol update message, a routing table update message, a request to make a routing decision, a link layer state updates message, a link state update messages, an exception message that cannot be dealt with in hardware, a program message, a message for a routing table miss, a time control message, a message for a packet marked as being of interest for snooping, or a message used to collect traffic diagnostics, address resolution messages (ARP) requests and replies, neighbor solicitation requests and replies, or general communication to the control plane of the network element.

6. The non-transitory machine-readable medium of claim 1, further comprising:
   determining, for a network data on egress from the network element, that the network data is to be forwarded to the control plane;
   classifying the network data based on characteristics of the network data; and storing the network data, for forwarding to the control plane, in an output queue based on a class of the network data.

7. A non-transitory machine-readable medium storing instructions which, when executed by one or more processing units of a network element, cause the processing units to perform operations comprising:
   receiving control plane network data at an input port of the network element, the network element comprising a plurality of input ports, each of the input ports being associated with a different plurality of output queues, wherein the control plane network data is data that is processed by the control plane;
   classifying the control plane network data based on characteristics of the control plane network data;
storing the control plane network data in one of a plurality of output queues specific to the input port based on a class of the control plane network data;
   forwarding control plane network data from a selected one of the plurality of output queues specific to the input port to a control plane of the network element;
   determining whether the control plane network data can be enqueued on an output queue specific to the input port for the control plane network data; and
   when the control plane network data cannot be enqueued on an output queue specific to the input port, applying a policer test to the control plane network data based on a combination of the input port and the class of the control plane network data, and storing the control plane network data in a common queue for the class of control plane network data when a bandwidth requirement associated with a policer applying the policer test is satisfied.

8. The non-transitory machine-readable medium of claim 7, wherein the network element comprises a plurality of input ports and each input port is associated with a set of policers for different classes of control plane network data.

9. The non-transitory machine-readable medium of claim 7, wherein the operations further comprise:
   applying a control plane policing policy to the control plane network data prior to enqueuing the control plane network data on an output queue where the control plane network data is dropped when the policer test fails.

10. A method comprising:
    receiving control plane network data at an input port of a network element, the network element comprising a plurality of input ports, each of the input ports being associated with a different plurality of output queues, wherein the control plane network data is data that is processed by the control plane;

classifying the control plane network data based on characteristics of the control plane network data;

storing the control plane network data in one of a plurality of output queues specific to the input port based on a class of the control plane network data; and forwarding control plane network data from a selected one of the plurality of output queues specific to the input port to a control plane of the network element, wherein:

each output queue is associated with a bandwidth, a shape, or a combination thereof; and control plane network data is dropped before placement in one of a plurality of output queues when a bandwidth requirement associated with the one of the plurality of output queues is exceeded and the one of the plurality of output queues is bigger than an associated tail drop threshold.

11. The method of claim 10, wherein each output queue of the input port is associated with a set of classes of control plane network data.

12. The method of claim 10, wherein each output queue of the input port is associated with a single class of control plane network data.

13. The method of claim 10, wherein the control plane network data comprises a system message for delivery to the control plane processor.

14. The method of claim 13, wherein the network element comprises a plurality of input ports and each input port is associated with a set of policers for different classes of control plane network data.

15. The method of claim 10, further comprising:
applying a control plane policing policy to the control plane network data prior to enqueuing the control plane network data on an output queue where the control plane network data is dropped when the policer test fails.

16. The method of claim 10, wherein the control plane network data comprises a routing protocol message, a routing table update message, a request to make a routing decision, a link layer state updates message, a link state update messages, an exception message that cannot be dealt with in hardware, a program message, a message for a routing table miss, a time control message, a message for a packet marked as being of interest for snooping, or a message used to collect traffic diagnostics, address resolution messages (ARP) requests and replies, neighbor solicitation requests and replies, or general communication to the control plane of the network element.

17. A method comprising:
receiving control plane network data at an input port of a network element, the network element comprising a plurality of input ports, each of the input ports being associated with a different plurality of output queues, wherein the control plane network data is data that is processed by the control plane;

classifying the control plane network data based on characteristics of the control plane network data;

storing the control plane network data in one of a plurality of output queues specific to the input port based on a class of the control plane network data;

forwarding control plane network data from a selected one of the plurality of output queues specific to the input port to a control plane of the network element;

determining whether the control plane network data can be enqueued on an output queue specific to the input port for the control plane network data; and when the control plane network data cannot be enqueued on an output queue specific to the input port, applying a policer test to the control plane network data based on a combination of the input port and the class of the control plane network data, and storing the control plane network data in a common queue for the class of control plane network data when a bandwidth requirement associated with a policer applying the policer test is satisfied.

18. A network element comprising:
a plurality of input ports, each of the input ports being associated with a different plurality of output queues, wherein an input port of the plurality of input ports receives control plane network data, the control plane network data being data that is processed by the control plane;

a processor coupled with a memory and the input port, the processor configured to:

classify control plane network data received at the input port based on characteristics of the control plane network data;

store the control plane network data in one of a plurality of output queues specific to the input port based on a class of the control plane network data, and forward control plane network data from a selected one of the plurality of output queues specific to the input port to a control plane of the network element, wherein:

each output queue is associated with a bandwidth, a shape, or a combination thereof; and control plane network data is dropped before placement in one of a plurality of output queues when a bandwidth requirement associated with the one of the plurality of output queues is exceeded and the one of the plurality of output queues is bigger than an associated tail drop threshold.

19. The network element of claim 18, wherein each output queue of the input port is associated with a single class of control plane network data.

20. A network element comprising:
a plurality of input ports, each of the input ports being associated with a different plurality of output queues, wherein an input port of the plurality of input ports receives control plane network data, the control plane network data being data that is processed by the control plane;

a processor coupled with a memory and the input port, the processor configured to:

classify control plane network data received at the input port based on characteristics of the control plane network data;

store the control plane network data in one of a plurality of output queues specific to the input port based on a class of the control plane network data;

forward control plane network data from a selected one of the plurality of output queues specific to the input port to a control plane of the network element;

determine whether the control plane network data can be enqueued on an output queue specific to the input port for the control plane network data; and when the control plane network data cannot be enqueued on an output queue specific to the input port, apply a policer test to the control plane network data based on a combination of the input port and the class of the control plane network data, and storing the control plane network data in a common queue for the class of control plane network data when a bandwidth requirement associated with a policer applying the policer test is satisfied.

\* \* \* \* \*